United States Patent
Knippa (10) Patent No.: US 11,724,143 B2
(45) Date of Patent: *Aug. 15, 2023

(54) PROCESSES FOR REMEDIATION OF A CONTAMINATED MATERIAL

(71) Applicant: BOLDWATER USA, LP, Cypress, TX (US)

(72) Inventor: Mark Knippa, Cypress, TX (US)

(73) Assignee: BOLDWATER USA, LP, Cypress, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/401,229

(22) Filed: Aug. 12, 2021

(65) Prior Publication Data

US 2021/0370119 A1 Dec. 2, 2021

Related U.S. Application Data

(63) Continuation of application No. 14/732,437, filed on Jun. 5, 2015, now Pat. No. 11,097,140.

(60) Provisional application No. 62/121,732, filed on Feb. 27, 2015, provisional application No. 62/009,075, filed on Jun. 6, 2014.

(51) Int. Cl.
| | |
|---|---|
| *A62D 3/02* | (2007.01) |
| *C02F 3/34* | (2023.01) |
| *B09C 1/10* | (2006.01) |
| *C02F 101/32* | (2006.01) |
| *C02F 101/34* | (2006.01) |
| *C02F 101/10* | (2006.01) |
| *C02F 103/06* | (2006.01) |
| *C02F 103/10* | (2006.01) |

(52) U.S. Cl.
CPC .............. *A62D 3/02* (2013.01); *B09C 1/10* (2013.01); *C02F 3/34* (2013.01); *C02F 3/342* (2013.01); *C02F 3/344* (2013.01); *C02F 3/348* (2013.01); *C02F 2101/10* (2013.01); *C02F 2101/32* (2013.01); *C02F 2101/345* (2013.01); *C02F 2103/06* (2013.01); *C02F 2103/10* (2013.01); *C02F 2209/001* (2013.01); *C02F 2209/02* (2013.01); *C02F 2209/06* (2013.01); *C02F 2209/09* (2013.01); *C02F 2209/22* (2013.01); *C02F 2305/06* (2013.01)

(58) Field of Classification Search
None
See application file for complete search history.

(56) References Cited

U.S. PATENT DOCUMENTS

| | | |
|---|---|---|
| 3,567,660 A | 3/1971 | Winkler |
| 4,727,031 A | 2/1988 | Brown et al. |
| 5,302,287 A | 4/1994 | Losack |
| 5,336,290 A | 8/1994 | Jermstad |
| 5,401,413 A | 3/1995 | Gatt |
| 5,525,139 A | 6/1996 | Gill |
| 5,582,627 A | 12/1996 | Yamashita |
| 5,609,667 A | 3/1997 | Dickerson |
| 5,609,668 A | 3/1997 | Gill |
| 5,613,452 A | 5/1997 | Marchesi et al. |
| 5,635,392 A | 6/1997 | Kopp-Holtwiesche et al. |
| 6,336,772 B1 | 1/2002 | Yamashita |
| 2005/0233656 A1 | 10/2005 | Royer et al. |
| 2007/0113875 A1 | 5/2007 | Wang et al. |
| 2010/0216217 A1 | 8/2010 | Hendrickson |
| 2011/0176871 A1 | 7/2011 | St. Pierre et al. |
| 2013/0288294 A1 | 10/2013 | Saul et al. |

FOREIGN PATENT DOCUMENTS

| | | |
|---|---|---|
| WO | WO 2008/000087 A1 | 1/2008 |
| WO | WO 2015/188042 A1 | 12/2015 |

OTHER PUBLICATIONS

Ball et al., "A review of the current options for the treatment and safe disposal of drill cuttings", Waste Management & Research, vol. 30, No. 5, pp. 457-473 (2012).
Das and Chandran, "Microbial Degradation of Petroleum Hydrocarbon Contaminants: An Overview", Biotechnol. Res. Int., 13 pages, doi: 10.4061/2011/941810, (2011).
First Substantive Examination from Mexican Patent Application No. MX/a/2016/016117, dated Jul. 17, 2020, Original Spanish Language with English Translation. 9 pages (2020).
Gonzalez et al., "Removal of a broad range of surfactants from municipal wastewater-comparison between membrane bioreactor and conventional activated sludge treatment", Chemosphere, vol. 67, pp. 335-343 (2007).
Hall, "Ecological and economical balance for sludge management options", Environment: European Commission, Proceedings of the Workshop on 'Problems around Sludge' (1999).
Hydrocarbon, Definition of Hydrocarbon by Merriam-Webster, Online article last updated Jan. 6, 2021, 5 pages, downloaded from https://www.merriam-webster.com/dictionary/hydrocarbon (2021).
International Search Report from PCT Patent Application No. PCT/US2015/034366 dated Aug. 26, 2015, application now published as International Publication No. WO2015/188024 dated Dec. 10, 2015.
Oberbremer et al., "Effect of the addition of microbial surfactents on hydeocarbon degredation in a soil population in a stirred reactor", Applied Microbiology abd Biotechnology, vol. 32, pp. 485-489 (1999).

(Continued)

*Primary Examiner* — Teresa E Knight
(74) *Attorney, Agent, or Firm* — McDermott Will & Emery LLP; Judy M. Mohr; Brennen P. Baylor (57) ABSTRACT

Methods to remediate a contaminated material are provided. In one embodiment, a biocatalyst that digests hydrocarbon contaminants is activated with a nutrient and the activated biocatalyst is combined with the contaminated material and water to form a mixture. The mixture is incubated for a period of time, and the level of contaminant in the mixture is determined to ascertain whether to incubate further, add additional biocatalyst mix, or provide the remediated material for further processing. In one embodiment, the remediated material is provided for reuse or recycling with a second material, such as a construction aggregate. The method is particularly suited for remediation of drill cuttings, mine tailings, hydrocarbon-contaminated soil, and the like.

20 Claims, 3 Drawing Sheets

(56) References Cited

OTHER PUBLICATIONS

Riser-Roberts, "Remediation of Petrolium Contaminated Soils: Biological, Physical and Chemical Processes", Lewis Publishers, pp. 1-526 (1998.
Yakimov et al., "Obligate Oil-Degrading Marine Bacteria", Curr. Opin. Biotechnol., vol. 18, pp. 257-266 (2007).
Chaineau et al., "Bioremediation of Oil-Based Drill Cuttings under Tropical Conditions", Presentation, Middle East Oil Show, Bahrain, Society of Petroleum Engineers, SPE 81562, 7 pages (2003).
Suja et al., "Effects of local microbial bioaugmentation and biostimulation on the bioremediation of total petroleum hydrocarbons (TPH) in crude oil contaminated soil based on laboratory and field observations", International Biodeterioration & Biodegradation, vol. 90, pp. 115-122 (2014).
Turner et al., "Bioremediation of drill cutting from oil based muds", Ph.D. Thesis, University of Nottingham, School of Chemical, Environmental, 312 pages (2001).
Yan et al., "Remediation of oil-based drill cuttings through a biosurfactant-based washing followed by a biodegradation treatment", Bioresource Technol., vol. 102, No. 22, pp. 10252-10259 (2011).

PROCESSES FOR REMEDIATION OF A CONTAMINATED MATERIAL

CROSS-REFERENCE TO RELATED APPLICATIONS

This application is a Continuation of U.S. Non-Provisional patent application Ser. No. 14/732,437, filed Jun. 5, 2015, now allowed, which claims the benefit of U.S. Provisional Application No. 62/009,075, filed Jun. 6, 2014 and of U.S. Provisional Application No. 62/121,732, filed Feb. 27, 2015, all of which are incorporated by reference herein in their entirety.

TECHNICAL FIELD

The subject matter described herein relates to processes for remediating a contaminated material using biologically active agents to yield a remediated material that can be reused and/or recycled.

BACKGROUND

The clean-up or removal of contaminants from various settings, including soil, sand, and ground and surface water, remains an on-going need. Hydrocarbon spills, chemical spills and industrial processes result in unwanted compounds becoming associated with settings wherein the compound is considered a contaminant. Of particular problem are contaminants from offshore and onshore oil and gas exploration and production. Drilling wells to extract oil and gas produces drill cuttings that are solid oil and gas drilling waste materials contaminated with hydrocarbon. Other contamination problems are accidental chemical, e.g., hydrocarbon, spills, from offshore rigs, ships, trains, and factories, where inadvertent mishaps result in discharge of a chemical such as a hydrocarbon compound at a site, such as soil, sand or water, where it is viewed as a contaminant. There remains a need for processes to remove contaminants from materials, and preferably to remediate the contaminated material in a process that does not yield a waste stream that requires further processing or disposal at a waste site, and preferably provides a remediated material that can be reused or recycled.

BRIEF SUMMARY

The following aspects and embodiments thereof described and illustrated below are meant to be exemplary and illustrative, not limiting in scope.

In one aspect, a method to remediate a contaminated material is provided. The method comprises activating a biocatalyst that digests hydrocarbon contaminants with a nutrient, to provide an activated biocatalyst; introducing in the presence of water the activated biocatalyst to a contaminated material to form a mixture; incubating the mixture for a period of time; determining a property of the mixture; and determining a level of contaminant in the mixture.

In one embodiment, activating may comprise activating for between 5-24 hours, or until the nutrient is more than 50% consumed by the biocatalyst, or until carbon dioxide level in effluent gas associated with the biocatalyst and nutrient is above a threshold level. In another embodiment, activating may comprise activating until the biocatalyst is aggressively digesting the nutrients and suitable for transition to the hydrocarbon contaminated material. Remaining or undigested nutrients remain in the mixture to support the transition and the decomposition of the contaminant (e.g., target hydrocarbons). Elevated localized carbon dioxide levels are observed in effluent gas associated with the process of hydrocarbon decay.

In another embodiment, a property of the mixture is determined during the method, where the property can be pH, dissolved oxygen content, viscosity, or some combination of two or three of these properties.

In yet another embodiment, the method further comprises adjusting pH, adjusting dissolved oxygen content or adjusting viscosity of the mixture. In one embodiment, a pH level of less than 3 or a pH level of greater than 11 triggers adding an additional amount of the aqueous mixture to the mixture.

In one embodiment, during the period of incubation time the mixture is mixed periodically. In another embodiment, the period of incubation time is from 6-8 hours. In other embodiments, the period of incubation is determined based on ambient conditions and altitude.

In still another embodiment, determining a level of contaminant comprises testing for a hydrocarbon contaminant level.

In one embodiment, the method comprises adding an additional amount of activated biocatalyst when a contaminant level is above a threshold amount to form an adjusted mixture.

In yet another embodiment, the method comprises mixing the adjusted mixture, incubating the adjusted mixture and testing the adjusted mixture for hydrocarbon contaminant level.

In another embodiment, incubating is performed at ambient temperature or at a preselected temperature.

In still another embodiment, activating further comprises activating the biocatalyst in the presence of a surfactant.

In one embodiment, the nutrient is a sugar or is a compound that provides nitrogen, potassium, or phosphates. In another embodiment, the nutrient is a food source, which may be a sugar or another food or energy source.

In another embodiment, the biocatalyst comprises bacterial microorganisms, intracellular enzymes, or extracellular enzymes.

In exemplary embodiments, the contaminated material is drill cuttings, soil, mine tailings, water contaminated with oil, or water contaminated with an organic solvent, such as mineral oil or a synthetic oil.

In one embodiment, the contaminated material is drill cuttings and the method further comprises pretreating the drill cuttings with activated biocatalyst prior to introducing the activated biocatalyst to the pretreated, contaminated material to form a mixture.

In another aspect, a method to remediate a contaminated material is provided. The method comprises providing a biocatalyst; instructing to activate the biocatalyst by incubation with a nutrient to provide an activated biocatalyst; and instructing that the activated biocatalyst be admixed with water and a contaminated material to remediate the contaminated material.

In one embodiment, instructing to activate comprises instructing to activate for between 5-24 hours, or wherein instructing to activate comprises instructing to activate until the nutrient is more than 50% consumed by the biocatalyst, or wherein instructing to activate comprises instructing to activate until carbon dioxide level in effluent gas associated with the biocatalyst and nutrient is above a threshold level. In another embodiment, instructing to activate comprises instructing to activate is performed under conditions to achieve an activated biocatalyst with an amount of nutrient in excess of that needed to activate the biocatalyst.

In another embodiment, instructing that the activated biocatalyst be admixed with water and a contaminated material forms a mixture, and the method further comprises instructing to determine a property of the mixture wherein the property is selected from pH, dissolved oxygen content, and viscosity.

In yet another embodiment, the method further comprises instructing that one or more of pH, dissolved oxygen content or viscosity of the mixture be adjusted.

In still another embodiment, instructing comprises informing that a pH level of less than 3 or a pH level of greater than 11 triggers adding an additional amount of the water to the mixture.

In one embodiment, instructing to activate the biocatalyst by incubation with a nutrient comprises instructing to activate the biocatalyst by incubation with a nutrient for an incubation period during which mixing occurs periodically.

In another embodiment, the method further comprises instructing to determine a level of contaminant.

In still another embodiment, the method further comprises instructing to add an additional amount of activated biocatalyst when a contaminant level is above a threshold amount, to form an adjusted mixture comprised of the contaminated material, activated biocatalyst, additional amount of activated biocatalyst and contaminated material.

In yet another embodiment, the method comprises instructing to mix the adjusted mixture, to incubate the adjusted mixture and test the adjusted mixture for hydrocarbon contaminant level. In one embodiment, instructing to activate the biocatalyst by incubation with a nutrient comprises instructing to incubate at ambient temperature.

In yet another aspect, a method to remediate and recycle a contaminated material is provided. The method comprises providing a biocatalyst and a nutrient that when mixed form an activated biocatalyst; mixing the activated biocatalyst with water and a contaminated material to form a mixture; incubating the mixture for a period of time; testing the mixture to ascertain contaminant level; processing the mixture to form a remediated material; and processing the remediated material with a second material to form a recycled product.

In one embodiment, the second material is a material suitable for use as a flexible base material for construction.

In another embodiment, the material suitable for construction is an aggregate comprised of gravel, sand or crushed stone.

In yet another embodiment, the second material is used to form a base layer of a paved surface or use used to form a paved surface, where the paved surface is selected from a road, a driveway, a parking lot or a sidewalk.

In one embodiment the contaminated material is drill cuttings and the method further comprises pretreating the drill cuttings by spraying or "washing" the hydrocarbon contaminated material with activated biocatalyst prior to mixing the activated biocatalyst with water and the pretreated, contaminated material to form a mixture.

Additional embodiments of the present methods will be apparent from the following description, drawings, examples, and claims. As can be appreciated from the foregoing and following description, each and every feature described herein, and each and every combination of two or more of such features, is included within the scope of the present disclosure provided that the features included in such a combination are not mutually inconsistent. In addition, any feature or combination of features may be specifically excluded from any embodiment of the present invention. Additional aspects and advantages of the present methods are set forth in the following description and claims, particularly when considered in conjunction with the accompanying examples and drawings.

DETAILED DESCRIPTION

I. Definitions

Various aspects now will be described more fully hereinafter. Such aspects may, however, be embodied in many different forms and should not be construed as limited to the embodiments set forth herein; rather, these embodiments are provided so that this disclosure will be thorough and complete, and will fully convey its scope to those skilled in the art.

Where a range of values is provided, it is intended that each intervening value between the upper and lower limit of that range and any other stated or intervening value in that stated range is encompassed within the disclosure. For example, if a range of 1 μm to 8 μm is stated, it is intended that 2 μm, 3 μm, 4 μm, 5 μm, 6 μm, and 7 μm are also explicitly disclosed, as well as the range of values greater than or equal to 1 μm and the range of values less than or equal to 8 μm.

As used in this specification, the singular forms "a," "an," and "the" include plural referents unless the context clearly dictates otherwise. Thus, for example, reference to an "agent" includes a single agent as well as two or more of the same or different agents.

II. Process for Remediation

The process described herein remediates a contaminated material using a natural catalyst, also referred to as a biological catalyst or biocatalyst, which has activity to decompose, degrade, consume or digest an organic or inorganic contaminant. In the process, the biocatalyst is activated and mixed with the contaminated material. The process is particularly useful for remediation of hydrocarbon-contaminated materials, such as soil, water, drill cuttings and mine tailings. As will be described in the embodiments below, the remediated material can be reused or recycled, and the process remediates the material without generating a waste stream or effluent that requires disposal or clean-up.

A. General Process

Figure 1:
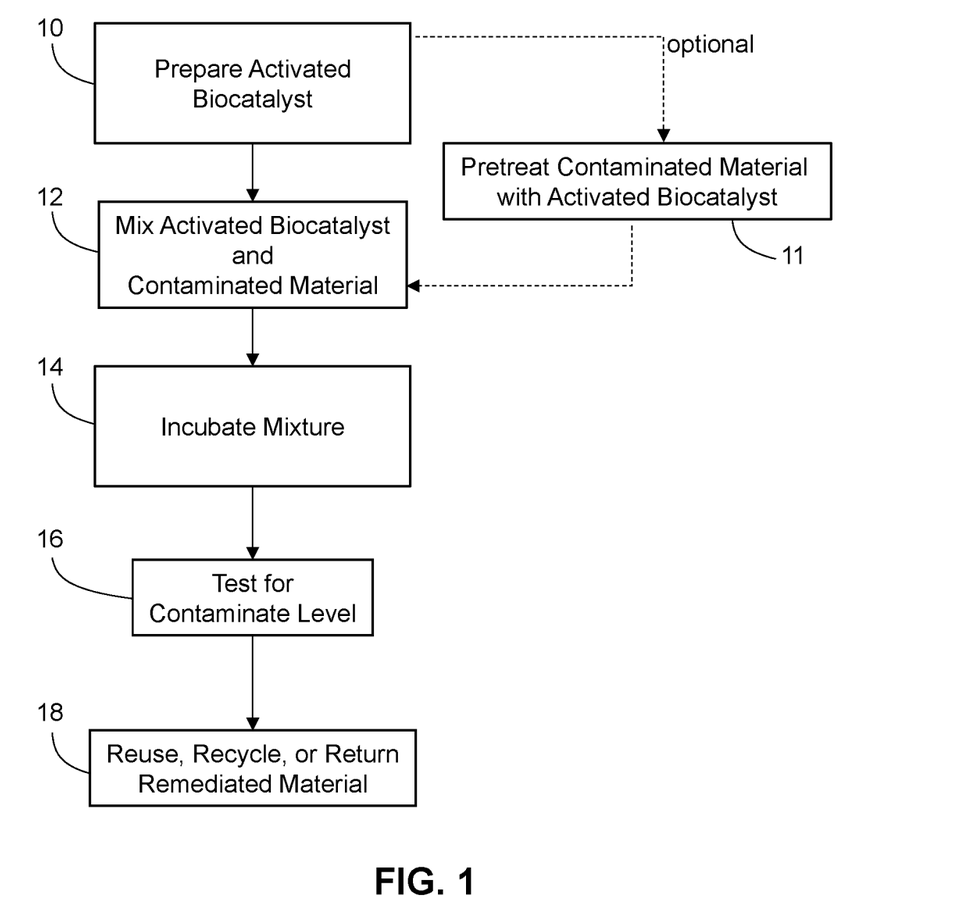
FIG. 1 illustrates steps of one embodiment of a process for remediating a contaminated material.

With initial reference to FIG. 1, a first embodiment of the process comprises preparing an activated biocatalyst 10. In one embodiment, the biocatalyst is activated by combining the biocatalyst, a nutrient and, optionally, water in a suitable container. Water is added to the mixture, for example, if the biocatalyst and/or nutrient is/are in dry form. If either of these components is provided as a solution or suspension in water, addition of water may not be necessary. The components remain in combination for a period of time sufficient to create the activated biocatalyst. The period of time needed to activate the biocatalyst will depend on the microbes and/or enzymes in the biocatalyst, the nutrient selected for use, temperature, volume, and other factors. In some cases, the biocatalyst is activated in about 1-30 minutes or about 1-60 minutes or about 5-60 minutes upon combination with a nutrient, and in other situations the biocatalyst and the nutrient require an activation time of between about 1-24 hours, between about 5-24 hours, between about 5-18 hours, or between about 8-15 hours.

As mentioned above, the biocatalyst has activity to decompose, degrade, consume or digest an organic or inorganic contaminant. Biocatalysts suitable for use in the process include enzymes and microorganisms, such as bacteria, yeast and fungi. The biocatalyst can be a mixture of enzymes and micro-organisms and in one embodiment is comprised of bacterial microorganisms, extracellular enzymes and intracellular enzymes. In one embodiment, the contaminant is a hydrocarbon, and the biocatalyst comprises a bacteria. Bacteria known to feed exclusively on hydrocarbons, and in the feeding process to degrade the hydrocarbon, are known as obligate hydrocarbonoclastic bacteria, and are found in marine environments and in soil (Yakimov, M. et al., *Current Opinion in Biotechnology*, 18(3):257 (2007)). For example, *Acinetobacter* sp. was found to be capable of utilizing n-alkanes of chain length $C_{10}$-$C_{40}$ as a sole source of carbon (Yakimov, supra). Bacterial genera, namely, *Gordonia, Brevibacterium, Aeromicrobium, Dietzia, Burkholderia*, and *Mycobacterium* isolated from petroleum contaminated soil were identified as organisms for hydrocarbon degradation, as well as *Sphingomonas* being capable of degradation of poly-aromatic hydrocarbons (Yakimov, supra).

Biocatalysis in the form of enzymes, yeast and fungi capable of degrading or participating in the degradation process of hydrocarbons are also known in the art. Fungal genera, namely, *Amorphoteca, Neosartorya, Talaromyces*, and *Graphium* and yeast genera, namely, *Candida, Yarrowia*, and *Pichia* isolated from petroleum-contaminated soil are organisms for hydrocarbon degradation (Yakimov, supra). A group of terrestrial fungi, namely, *Aspergillus, Cephalosporium*, and Pencillium are reported to degrade crude oil hydrocarbons (Yakimov, supra). The yeast species, namely, *Candida lipolytica, Rhodotorula mucilaginosa, Geotrichum* sp, and *Trichosporon mucoides* isolated from contaminated water were noted to degrade petroleum compounds (Yakimov, supra). Enzymes produced by microorganisms that are involved in biodegradataion of hydrocarbons include soluble monooxygenases, produced from *Methylococcus, Methylosinus, Methylocystis, Methylomonas*, and *Methylocella* use $C_1$-$C_8$ alkanes, alkenes and cycloalkanes as substrates. Particulate methane monooxygenases are produced from the microorganisms *Methylobacter, Methylococcus*, and *Methylocystis* and use $C_1$-$C_5$ (halogenated) alkanes and cycloalkanes as substrates. The enzymes AlkB related alkane hydroxylases are produced from the microorganisms *Pseudomonas, Burkholderia, Rhodococcus*, and *Mycobacterium* and use $C_5$-$C_{16}$ alkanes, fatty acids, alkyl benzenes, cycloalkanes as substrates. (Yakimov, supra).

Hydrocarbons differ in their susceptibility to microbial attack. The susceptibility of hydrocarbons to microbial degradation can be generally ranked as follows: linear alkanes>branched alkanes>small aromatics>cyclic alkanes. Petroleum hydrocarbons can be divided into four classes: the saturates, the aromatics, the asphaltenes (phenols, fatty acids, ketones, esters, and porphyrins), and the resins (pyridines, quinolines, carbazoles, sulfoxides, and amides). In one embodiment, the processes described herein are contemplated for use in remediation of any one of or any combination of hydrocarbons, selected from linear alkanes, branched alkanes, small aromatics, and cyclic alkanes.

With continuing reference to FIG. 1, the biocatalyst is activated by combining it with a nutrient. In one embodiment, the nutrient can be a sugar, such as a monosaccharide or a disaccharide or an oligosaccharide. Examples include sucrose, glucose, fructose, galactose, maltose, and lactose. In another embodiment, the nutrient is compound or composition that provides one or more of nitrogen, potassium, and/or phosphate. One example is a fertilizer that provides all three of nitrogen, potassium and phosphate. Other examples are compounds that contain, and donate, nitrogen, such as urea, nitropropane, ammonium nitrate and anhydrous ammonia, and compounds that contain phosphate, such as phosphoric acid.

In one embodiment, the biocatalyst is activated in the presence of a surfactant. In another embodiment, a surfactant is added to the contaminated material. A surfactant acts to lower the surface tension between the aqueous phase of the mixture and the hydrocarbon contaminant, and can bring the components of the mixture into more intimate contact for enhanced remediation. Zwitterionic, anionic and cationic surfactants may be suitable, depending on the contaminant and other components of the mixture. Examples include ammonium lauryl sulfate, sodium lauryl sulfate, sodium laureth sulfate, dioctyl sodium sulfosuccinate, alkyl ether phosphates, lecithin, benzalkonium chloride, dioctadecyldimetylammonium bromide. Non-ionic surfactants may also be suitable and include fatty alcohols, polyoxyethylene glycol alkyl ethers, glycosides, polyoxyethylene glycol octylphenol ethers, poloxamers, polysorbates, and sorbitan alkyl esters.

Activation of the biocatalyst can be ascertained based on knowledge of the biocatalyst properties and its requirements for activation, in terms of time, temperature and nutrition. Activation of the biocatalyst can also be ascertained by an analytical approach, for example, by measuring carbon dioxide production in the head space of the container in which the biocatalyst and nutrient are combined, where an initial increase in $CO_2$ production may be observed as the microorganisms in the biocatalyst begin consumption of the nutrient and $CO_2$ production may plateau as the microorganisms reach a steady state consumption of nutrient indicating activation. When $CO_2$ content in a space associated with the biocatalyst is above a certain level or plateaus at a certain level this serves as an indicator that the biocatalyst is activated. The consumption of nutrient by the biocatalyst can also be measured to ascertain activation, for example, by measuring nitrogen, sugar, or phosphorus content and observing an initial decrease in the content of one of these compounds. When a certain percentage of the compound, such as 50%, 60%, 65% or more than 50%, 60%, or 65%, is consumed or depleted this is an indication that the biocatalyst is activated. In one embodiment, activation of the biocatalyst is conducted for a fixed period of time that can range from less than one hour (e.g., 5 minutes to 59 minutes) or can be for between 1-24 hours, 5-24 hours, 8-24 hours, 10-20 hours, 12-20 hours, or 18-24 hours.

The activated biocatalyst is mixed with the contaminated material, as indicated at 12 in FIG. 1. In one embodiment, the contaminated material and activated biocatalyst are combined in situ, intending that the activated biocatalyst is introduced at the site of contamination. In another embodiment, the contaminated material and activated biocatalyst are combined ex situ of the contaminated site and/or of the location of the contaminated material. The contaminated material and activated biocatalyst are introduced in a suitable container, such as a drill cuttings box, a recycling waste skip or a boat rubbish skip or waste skip. Water is introduced concurrently or sequentially with the contaminated material and activated biocatalyst into the container, to form a mixture.

FIG. 1 also illustrates an optional pretreatment step that can be conducted for certain contaminated materials, and in one embodiment the optional pretreatment step is undertaken when the contaminated material is a hydrocarbon contaminate, such as cuttings from oil/gas drilling sites. For materials contaminated with hydrocarbons, the contaminated material can be optionally pretreated, as indicated at 11 in FIG. 1, with an activated biocatalyst (and/or an optional surfactant) prior to mixing the activated biocatalyst with the contaminated material (as discussed in the preceding paragraph with respect to 12 in FIG. 1). The optional pre-treatment, sometimes referred to as a "wash" or "spray pre-treatment" of the contaminated material with activated biocatalyst typically involves contacting the contaminated material with the activated biocatalyst such as by spraying the activated biocatalyst onto the contaminated material (e.g., drill cuttings). As a skilled artisan understands, when drill cuttings are remediated, the conventional practice is to transfer the cuttings from the rig to a shaker. From the shaker, the fluid is recycled back to the rig and the cuttings are transferred to a dryer and/or a centrifuge to further separate the cuttings from the drilling fluids. The present process contemplates the use of a second set of shakers, the drying shakers, that follows the rig shakers and before other drying or remediation apparatus, to allow contacting the drill cuttings when on the drying shaker, such as by spraying the activated biocatalyst onto the cuttings. The activated biocatalyst sprayed across the drying shaker washes the hydrocarbons from the exterior of the hydrocarbon contaminated material and this mixture drains to a separate holding tank where it is allowed to separate into the respective oil and water phases. The activated biocatalyst is recycled to the drying shaker for reuse in the process, utilized in the slurry process, or is disposed of, while the oil based drilling fluids from the shaker is recycled to the drilling operation at the rig, and the cuttings, now pretreated with activated biocatalyst, are transferred to a container for further treatment (e.g., the pretreated cuttings are used in step 12, described above, by mixing the pretreated contaminated material with activated biocatalyst.

The mixture is incubated, 14, for a period of time. Typically, the incubation occurs at ambient temperature in which the container is placed, although it is contemplated that the container could be warmed or cooled as needed for the incubation period. During incubation the mixture can be mixed and/or tested (assayed). In one embodiment, the mixture is mixed periodically. In another embodiment, a sample of the mixture is taken periodically to determine a property of the mixture in order to gauge decomposition of the contaminant, health/activity of the biocatalyst, etc. The mixture can be tested to determine it pH level, its oxygen content or viscosity, for example. In some situations, a pH level of less than 3 or a pH level of greater than 11 serves as an indicator for making an adjustment to the mixture to bring the pH of the mixture between about 3 and about 11. An adjustment to the pH can be done by adding additional water, a buffer, or other chemical to adjust the pH, thus forming an 'adjusted mixture.' The oxygen content of the mixture can be altered by adding additional water or by mixing, thus forming an 'adjusted mixture.' The viscosity of the mixture can be adjusted by adding additional water, contaminated material or a thickener, to form an 'adjusted mixture.'

The mixture, or adjusted mixture, is incubated for a period of time. The period of incubation time will vary depending on a number of factors identifiable to a skilled artisan, including type of contaminant, extent of contamination, biocatalyst used in the process, and temperature. In one embodiment, the incubation time is for between about 2-48 hours, or between about 2-24 hours, or between about 4-20 hours, or between about 4-18 hours, or between about 6-12 hours or between about 6-8 hours.

During or after the incubation time the mixture or adjusted mixture is tested to determine the concentration or level of contaminant, 16. Where the contaminant is a hydrocarbon, a sample of the mixture or adjusted mixture is taken from the container and tested for concentration of the hydrocarbon, using known analytical techniques such as retort, gas chromatography, high pressure liquid chromatography, atomic absorption, spectrophotometry, and the like. Incubation continues until a desired reduction in contaminant level is achieved, with adjustments to the mixture and testing of contaminant level repeated as needed.

Once the contaminant level in the mixture is at or below a desired level, the mixture is considered to be a mixture containing a remediated material. The mixture with the remediated material is then returned to the original contamination site, reused or recycled, 18.

In another aspect, a process to remediate a contaminated material comprises providing a biocatalyst alone or in conjunction with a nutrient for the biocatalyst. The biocatalyst is provided along with instructions to (i) activate the biocatalyst by incubation with a nutrient to provide an activated biocatalyst; and (ii) admix the activated biocatalyst with water and a contaminated material to remediate the contaminated material. The instructions that accompany the biocatalyst can also include instructions to activate the biocatalyst for a period of time (such as any of the time periods specified above), to mix the activated biocatalyst with the contaminated material to form a mixture, and to adjust the properties of the mixture as needed. The instructions can also include instructions to determine a level of contaminant.

B. Drill Cuttings, Mine Tailings

A working embodiment of the process described above is set forth in FIG. 2, where the process is utilized to remediate hydrocarbon-contaminated drill cuttings or mine tailings. Mine tailings are materials left over after extraction of valuable minerals from ore. The mine tailings are distinct from "waste rock" that is moved and discarded along with soil and organic matter as miners dig down to access the underlying ore. The size and composition of the mine tailings varies depending on the mining method. For example, in hardrock metal mining the ore is usually crushed and then processed, resulting in fine particles that may also contain chemicals used for mineral extraction. Disposal of mine tailings is usually the single biggest environmental concern facing a hardrock metal mine. Toxic chemicals used to extract the valuable materials from the ore, such as cyanide used in gold mining, remain in the tailings at the end of the process, and may leach out into ground water. The processes described herein are contemplated for use in remediating mine tailings.

When drilling oil and gas wells into subterranean formations below the earth's surface particles of the formation drilled through, known as drill cuttings, are formed by the drilling process. These cuttings vary in size from sand size to pebble size (grain size classes and terminology is known in the art, for example, by the Wentworth size class, where sands to pepples range in grain size from 0.0625 mm to 16 mm) and can carry petroleum hydrocarbons from a hydrocarbon-based drilling mud used to drill the well, from petroleum hydrocarbons naturally occurring in the formations that were drilled through, or from other sources. The result is that the drill cuttings recovered at the earth's surface carry, either internally or on their surface or both, petroleum hydrocarbons. The processes described herein are contemplated for use in remediating drill cuttings.

In remediating drill cuttings or mine tailings, the process reduces the total hydrocarbon or petroleum hydrocarbon content to an environmentally friendly or regulatory acceptable level for return to the original site of contamination or reuse or recycling. Environmentally friendly level refers to any federal, state or local requirements that apply to the disposal of drill cuttings on the earth's surface that, based on good science, will permit or facilitate re-vegetation.

Figure 2:
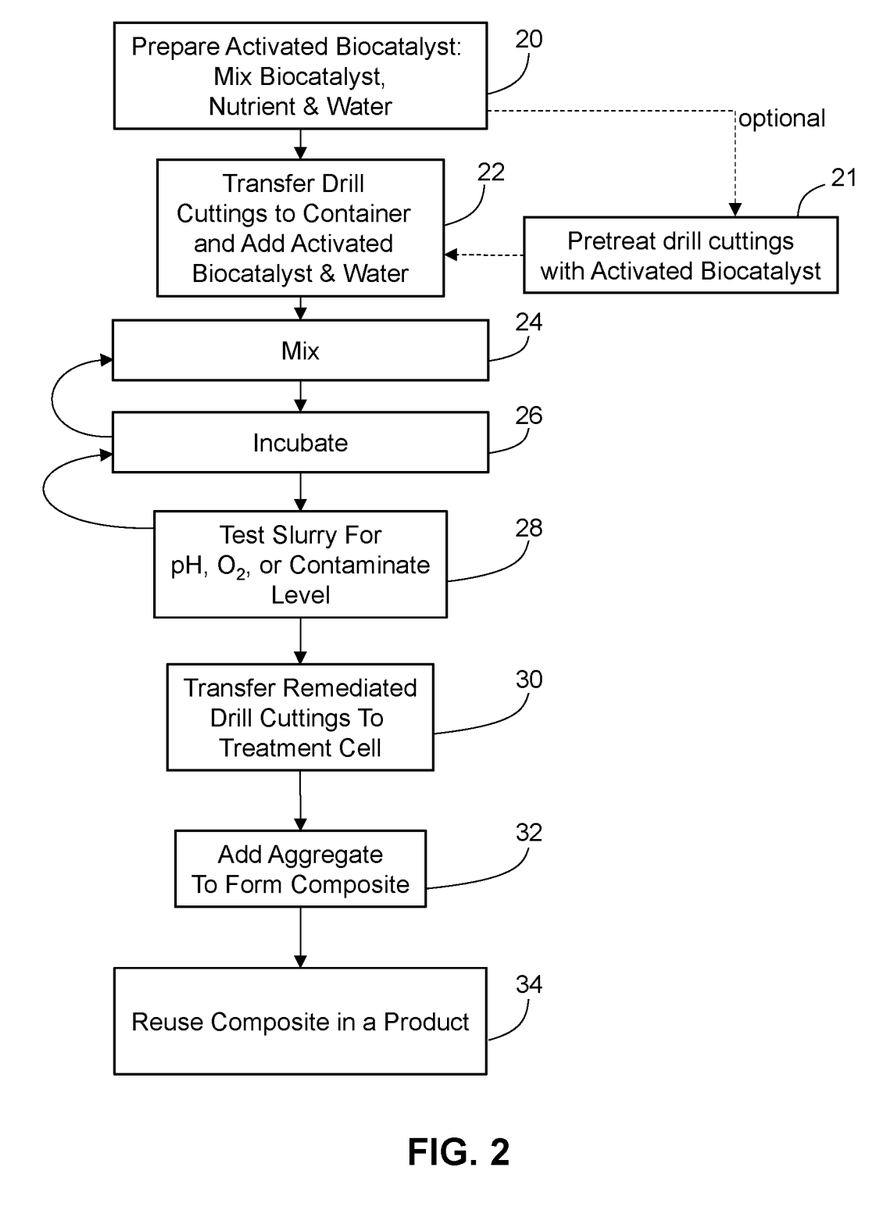
FIG. 2 is a flow diagram that shows steps of another embodiment of a process for remediating drill cuttings, such as hydrocarbon-contaminated drill cuttings associated with a borehole from an oil or gas well.

In the process for remediating contaminated drill cutting (or mine tailings), the biocatalyst is activated by mixing it with a nutrient and water, if needed, 20. The activated biocatalyst is introduced to the contaminated drill cuttings, 22, typically in a drill cuttings box in which the contaminated material has been placed. Optionally, the drill cuttings are pretreated with the activated biocatalyst, 21, by contacting the drill cuttings with the activated biocatalyst. In one embodiment, the activated biocatalyst is sprayed onto the drill cuttings on a shaker, and the pretreated drill cuttings are transferred to a container for mixture with the activated biocatalyst in step 22 without a dryer or centrifugation step (as is conventionally done with drill cuttings exiting a shaker). Activated biocatalyst from the shaker is reused in the process or is disposed of, drilling fluid from the shaker is recycled from the shaker to the rig, and the cuttings, now pretreated with activated biocatalyst, are transferred to a container for further treatment (e.g., the pretreated cuttings are used in step 22 by mixing the pretreated contaminated material with activated biocatalyst). Water is added to the activated biocatalyst and contaminated drill cuttings to form a mixture, which in this embodiment is a slurry, and the slurry is mixed, 24, incubated, 26, and tested for a property, such as pH, oxygen content, viscosity and/or contaminant level, 28. The more detailed discussion above on each of these steps applies equally to this exemplary embodiment.

The remediated drill cuttings are transferred to another container, such as a treatment cell, 30, for further processing. In one embodiment, the remediated drill cuttings are combined with a second material to form a composite useful for another purpose, 32. In one embodiment, the second material is a material suitable for use in a road structure. A typical road construction includes a sub-grade of supporting native rock, soil, sand, clay or other material onto which a base layer generally comprising a depth of crushed gravel or aggregate is placed and compacted to form the paved surface. The remediated drill cuttings are combined with one or more of the materials used in construction of a road, a road sub-grade or a base layer. In one embodiment, the remediated drill cuttings are combined with an aggregate comprised of gravel, sand or crushed stone to form a composite that is used in a product, 34, for example, in a road, a driveway, a parking lot or a sidewalk. In one embodiment, the product 34 is used to form a caliche or crushed rock road or pad site, for example on county roads, leased land for oil and gas exploration or for similar purposes, or other sites. In other embodiments, the product 34 is used to make paver bricks, canal blocks, flood blocks or jetty-type blocks. The ratio of remediated drill cuttings to aggregate can vary, and in one embodiment is selected to achieve a residual contaminant level in the remediated drill cuttings that is less than a regulatory limit for the contaminant. The actual proportions of drill cuttings relative to aggregate may be determined through assessment of the relative amounts of and properties of the contaminants. In one embodiment, the drill cuttings are blended with aggregate in a ratio of between 5-50% remediated drill cuttings, remainder aggregate. The blending of drill cuttings with aggregate may be achieved through use of appropriate mixing equipment including reclaimers either at the initial processing site or at the road construction site, aggregate quarry or an asphalt plant. In one embodiment, the remediated drill cuttings in combination with the second material yield a contaminant level that is at or below an acceptable level, which is typically a contaminant level that satisfies a regulatory (state, local, federal) level. That is, the contaminant level in the remediated drill cuttings prior to addition of the second material may be greater than the acceptable contaminant level, and addition of the second material results in a product that has a contaminant level that is at or lower than a regulatory mandated level for use or discharge of that contaminant into the environment.

It will be appreciated that the embodiment of remediating hydrocarbon-contaminated drill cuttings is merely exemplary, as the process is application to the remediation of contaminants in soil, mine tailings, water, and other materials.

C. Contaminated Soil

Leaks and accidental spills of hydrocarbons and chemicals occur regularly during the exploration, production, refining, transport, and storage of petroleum and petroleum products. Release of hydrocarbons into the environment whether accidentally or due to human activities is a main cause of water and soil pollution. Chemicals commonly involved in soil pollution (also referred to as soil contamination) are petroleum hydrocarbons, pesticides and lead and other heavy metals. Soil contamination can also happen as a result of underground storage tanks rupturing or the leaching of waste from landfills. Mining, fertilizer application, oil and fuel dumping and a multitude of other environmental issues can also cause pollution of the soil. One of the more common contaminants are hydrocarbon-based compounds, and typical examples include soil associated with compounds from refineries, service stations, where both heavy-fraction hydrocarbons and light-fraction hydrocarbons that are inadvertently discharged into soil. Light-fraction hydrocarbon contaminate compounds include gasoline and aromatic compounds, and heavy-fraction hydrocarbon contaminate compounds include diesel and kerosene.

Figure 3:
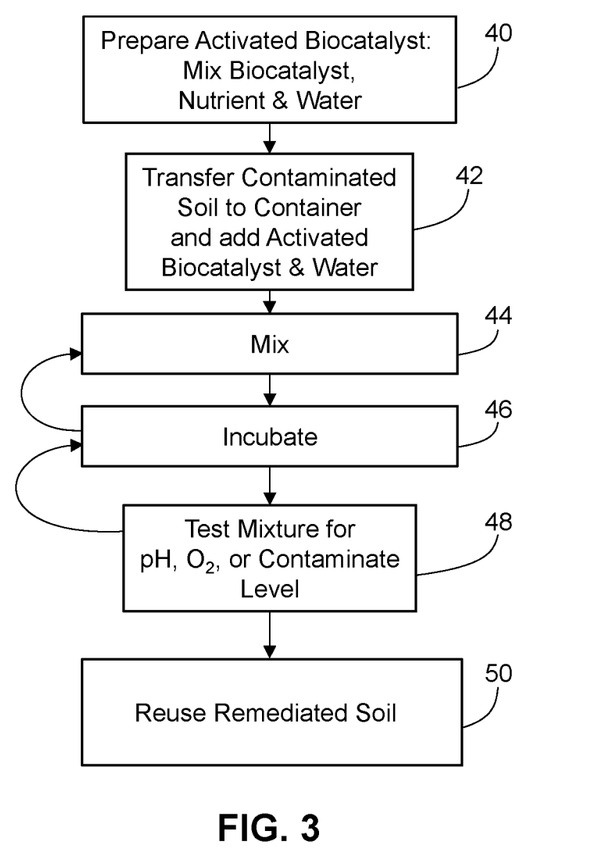
FIG. 3 is a flow diagram that shows steps of another embodiment of a process for remediating contaminated soil.

In one embodiment, a process for remediation of contaminated soil is provided. With reference to FIG. 3, the process comprises activating the biocatalyst by combining it with a nutrient and, if needed, water 40. The contaminated soil, which can be in situ or ex situ having been previously transferred to a suitable container, is mixed with the activated biocatalyst, 42. Water is added to the activated biocatalyst and contaminated soil to form a mixture, and the mixture is mixed, 44, incubated, 46, and tested for a property, such as pH, oxygen content, viscosity and/or contaminant level, 48. The more detailed discussion above on each of these steps applies equally to this exemplary embodiment.

The remediated soil can then be reused, 50. Reuses include returning the remediated soil to its original site or to a different site.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

It is claimed:

1. A method for remediating a hydrocarbon-contaminated material, comprising the steps of:
   (i) providing a biocatalyst that digests hydrocarbon contaminants, the biocatalyst comprising at least one bacterial microorganism;
   (ii) activating the biocatalyst for a period of time not exceeding about 24 hours, wherein activating comprises combining the biocatalyst with one or more nutrient in a container, said one or more nutrient does not comprise said hydrocarbon;
   (iii) introducing the activated biocatalyst to the hydrocarbon-contaminated material to form a mixture;
   (iv) incubating the mixture for a period of time not exceeding about 48 hours;
   (v) periodically determining a level or concentration of the hydrocarbon contaminant in the mixture; and
   (vi) detecting a reduced level or reduced concentration of the hydrocarbon contaminant in the mixture that is at or below a desired threshold level or concentration of the hydrocarbon contaminant, thereby remediating the hydrocarbon-contaminated material.

2. The method of claim 1, wherein activating comprises combining for not more than about 18 hours.

3. The method of claim 1, wherein activating comprises combining for not more than about 60 minutes.

4. The method of claim 1, wherein activating comprises combining for not more than about 30 minutes.

5. The method of claim 1, wherein said at least one nutrient is selected from:
   (a) a sugar,
   (b) a compound that provides one or more of nitrogen, potassium or phosphate,
   (c) a composition that provides one or more of nitrogen, potassium or phosphate, and
   (d) any combination of the foregoing.

6. The method of claim 1, wherein incubating does not exceed about 24 hours.

7. The method of claim 1, wherein incubating does not exceed about 12 hours.

8. The method of claim 1, wherein incubating does not exceed about 8 hours.

9. The method of claim 1, wherein incubating comprises periodically monitoring the mixture by determining a property of the mixture, the property selected from:
   (a) pH,
   (b) dissolved oxygen content,
   (c) viscosity of the mixture, and
   (d) any combination of (a), (b) and (c).

10. The method of claim 1, wherein incubating comprises periodically monitoring the mixture by determining a property of the mixture indicating a need for an adjustment selected from:
    (a) pH,
    (b) dissolved oxygen content,
    (c) viscosity of the mixture, and
    (d) any combination of (a), (b) and (c), and
the method further comprising:
    (a') adjusting pH,
    (b') adjusting dissolved oxygen content,
    (c') adjusting viscosity of the mixture, or
    (d') any combination of (a'), (b') and (c'), to provide an adjusted mixture, wherein providing the adjusted mixture maintains the biocatalyst in an activated state.

11. The method of claim 1, wherein incubating comprises adding an additional amount of activated biocatalyst to the mixture when the hydrocarbon contaminant level or concentration is above a desired threshold amount, to form an adjusted mixture.

12. A method for remediating a hydrocarbon-contaminated body of water, comprising the steps of:
    (i) providing a biocatalyst that digests hydrocarbon contaminants, the biocatalyst comprising at least one bacterial microorganism;
    (ii) activating the biocatalyst, wherein activating comprises combining the biocatalyst with one or more nutrient in a container, said one or more nutrient does not comprise said hydrocarbon;
    (iii) introducing the activated biocatalyst to the hydrocarbon-contaminated body of water to form a mixture;
    (iv) incubating the mixture;
    (v) periodically determining a level or concentration of the hydrocarbon contaminant in the mixture; and
    (vi) detecting a reduced level or concentration of the hydrocarbon contaminant in the mixture that is at or below a desired threshold level or concentration of the hydrocarbon contaminant, thereby remediating the hydrocarbon-contaminated body of water.

13. The method of claim 12, wherein the body of water is selected from ground water and surface water.

14. The method of claim 12, wherein the hydrocarbon-contaminated body of water comprises an oil or an organic solvent.

15. The method of claim 12, wherein the hydrocarbon-contaminated body of water comprises an oil selected from a mineral oil and a synthetic oil.

16. The method of claim 12, wherein said at least one nutrient is selected from:
    (a) a sugar,
    (b) a compound that provides one or more of nitrogen, potassium or phosphate,
    (c) a composition that provides one or more of nitrogen, potassium or phosphate, and
    (d) any combination of the foregoing.

17. A method for remediating a hydrocarbon-contaminated material in situ, comprising the steps of:
    (i) providing a biocatalyst that digests hydrocarbon contaminants, the biocatalyst comprising at least one bacterial microorganism;
    (ii) activating the biocatalyst, wherein activating comprises combining the biocatalyst with one or more nutrient in a container, said one or more nutrient does not comprise said hydrocarbon;
    (iii) introducing the activated biocatalyst to the hydrocarbon-contaminated material in situ at the site of contamination to form an in situ mixture;
    (iv) incubating the in situ mixture;
    (v) periodically determining a level or concentration of the hydrocarbon contaminant in the in situ mixture; and
    (vi) detecting a reduced level or concentration of the hydrocarbon contaminant in the in situ mixture that is at or below a desired threshold level or concentration of the hydrocarbon contaminant, thereby remediating the hydrocarbon-contaminated material in situ.

18. The method of claim 17, wherein the hydrocarbon contaminated material to be treated in situ is a hydrocarbon contaminated soil.

19. The method of claim 17, wherein the hydrocarbon contaminated material to be treated in situ is a hydrocarbon contaminated groundwater.

20. The method of claim 17, wherein incubating comprises periodically monitoring the mixture by determining a property of the mixture indicating a need for an adjustment, and incubating further comprises:
  (a) adjusting pH,
  (b) adjusting dissolved oxygen content,
  (c) adjusting viscosity of the mixture, or
  (d) any combination of (a), (b) and (c), to provide an adjusted mixture, wherein providing the adjusted mixture maintains the biocatalyst in an activated state.

\* \* \* \* \*